United States Patent
Lansdown et al.

(10) Patent No.: US 12,484,930 B2
(45) Date of Patent: Dec. 2, 2025

(54) SUTURE GUIDE AND SYSTEMS AND METHODS OF USING SAME

(71) Applicants: UNITED STATES GOVERNMENT AS REPRESENTED BY THE DEPARTMENT OF VETERANS AFFAIRS, Washington, DC (US); THE REGENTS OF THE UNIVERSITY OF CALIFORNIA, Oakland, CA (US)

(72) Inventors: Drew Lansdown, San Francisco, CA (US); Brian Feeley, San Francisco, CA (US)

(73) Assignees: UNITED STATES GOVERNMENT AS REPRESENTED BY THE DEPARTMENT OF VETERANS AFFAIRS, Washington, DC (US); The Regents of the University of California, Oakland, CA (US)

( * ) Notice: Subject to any disclaimer, the term of this patent is extended or adjusted under 35 U.S.C. 154(b) by 334 days.

(21) Appl. No.: 18/026,988

(22) PCT Filed: Sep. 17, 2021

(86) PCT No.: PCT/US2021/050845
§ 371 (c)(1),
(2) Date: Mar. 17, 2023

(87) PCT Pub. No.: WO2022/061095
PCT Pub. Date: Mar. 24, 2022

(65) Prior Publication Data
US 2023/0355269 A1    Nov. 9, 2023

Related U.S. Application Data

(60) Provisional application No. 63/080,196, filed on Sep. 18, 2020.

(51) Int. Cl.
*A61B 17/34* (2006.01)
*A61B 17/04* (2006.01)

(52) U.S. Cl.
CPC ...... *A61B 17/3421* (2013.01); *A61B 17/0401* (2013.01); *A61B 17/0469* (2013.01);
(Continued)

(58) Field of Classification Search
CPC ............ A61B 17/0401; A61B 17/0469; A61B 2017/0409; A61B 17/3421; A61B 2017/0414
See application file for complete search history.

(56) References Cited

U.S. PATENT DOCUMENTS

D701,958 S      4/2014  Griffis, III
2007/0198017 A1  8/2007 Tschakaloff et al.
(Continued)

OTHER PUBLICATIONS

International Search Authority Search Report and Written Opinion, dated Dec. 27, 2021 for PCT/US21/50845.

*Primary Examiner* — Katherine Shi
(74) *Attorney, Agent, or Firm* — Ballard Spahr LLP

(57) ABSTRACT

A cannula can comprise a main body portion having an outer peripheral surface, a longitudinal axis, a transverse axis that is perpendicular to the longitudinal axis, and opposing first and second ends that are spaced relative to the longitudinal axis. A through-bore can extend through the main body portion. The through bore can comprise a first guide bore, a second guide bore spaced from the first guide bore relative to the transverse axis, and a connecting portion that extends between the first bore and the second bore. A tip portion can extend from the second end of the main body portion relative to the longitudinal axis. The tip portion can comprise a bore therethrough that is coaxial with the first guide bore.

16 Claims, 23 Drawing Sheets

(52) U.S. Cl.
CPC ........... *A61B 2017/0409* (2013.01); *A61B 2017/0475* (2013.01); *A61B 2017/3447* (2013.01)

(56) References Cited

U.S. PATENT DOCUMENTS

| | | |
|---|---|---|
| 2008/0306511 A1 | 12/2008 | Cooper et al. |
| 2009/0149883 A1 | 6/2009 | Brunsvold |
| 2009/0312793 A1 | 12/2009 | Huxel et al. |
| 2013/0158598 A1 | 6/2013 | Lizardi |
| 2016/0242793 A1 | 8/2016 | Norton |
| 2017/0119382 A1 | 5/2017 | Denham |

SUTURE GUIDE AND SYSTEMS AND METHODS OF USING SAME

CROSS-REFERENCE TO RELATED APPLICATION

This application is a national phase filing under 35 U.S.C. § 371 of International Application No. PCT/US2021/050845, filed Sep. 17, 2021, which claims priority to and the benefit of U.S. Provisional Patent Application No. 63/080,196, filed Sep. 18, 2020. The entirety of of each these applications is hereby incorporated by reference herein.

FIELD

This application relates to apparatuses, systems, and methods for connecting soft tissue to bone.

BACKGROUND

Conventional surgeries in which a soft tissue is anchored to a bone, such as a remplissage procedure for shoulder instability or repairs of partial-thickness rotator cuff tears, are typically done with limited visual confirmation of the placement of the anchor and/or the suture. FIGS. 1A-1E illustrate a typical remplissage procedure for a rotator cuff in five sequential steps. In step one, a conventional cannula 10 is inserted into the joint. In step two, an anchor 12 is then inserted into the bone, with the anchor having a suture 14 attached thereto. In step three, the conventional cannula 10 is then pulled back out of the cuff by a distance. The medical professional approximates this distance without any way of confirming that the conventional cannula 10 is fully retracted from the cuff or if the conventional cannula is retracted too far (e.g., with the end retracted into the deltoid). In step four, a penetrator 16 is used to create a new pathway through the cuff to retrieve the suture 14, and in step five, the suture is knotted. Conventionally, the suture 14 is tied blindly, so the knot can be improperly positioned (e.g., in the deltoid muscle). Sometimes, a camera has to be inserted in order to determine the location where the knot is tied. The security of the knot is not easily ascertained. Thus, a better way of attaching the soft tissue to the bone is desirable.

SUMMARY

Disclosed herein, in one aspect, is a cannula comprising a main body portion having an outer peripheral surface, a longitudinal axis, a transverse axis that is perpendicular to the longitudinal axis, and opposed first and second ends spaced along the longitudinal axis. A through-bore can extend through the main body portion from the first end of the main body portion to the second end of the main body portion. The through-bore can comprise a first needle guide bore, a second needle guide bore spaced from the first needle guide bore along the transverse axis, and a connecting portion that extends between the first needle guide bore and the second needle guide bore. A tip portion can extend from the second end of the main body portion along the longitudinal axis. The tip portion can comprise a bore therethrough that is coaxial with the first needle guide bore.

A method of using the cannula can comprise inserting a guide needle into the surgical site and inserting the cannula into the surgical site over the guide needle with the guide needle in the first needle guide bore so that the tip portion of the cannula extends at least partially through the soft tissue, and removing the guide needle from the cannula. A first anchor site can be formed into the bone through the first needle guide bore. A first anchor can be inserted into the first anchor site. A second anchor site can be formed into the bone through the second needle guide bore. A second anchor can be inserted into the second anchor site. A surgical thread can be inserted into the first anchor through the first needle guide bore. The surgical thread can be inserted into the second anchor through the second needle guide bore.

In one aspect, an assembly can comprise a first all-suture anchor, a second all-suture anchor, and a suture coupled to, and extending between, the first all-suture anchor and the second all-suture anchor. In further aspects, the assembly can further comprise a first anchor inserter operatively coupled to the first all-suture anchor and a second anchor inserter operatively coupled to the second all-suture anchor. In still further aspects, the suture can define a loop.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Figure 1A:
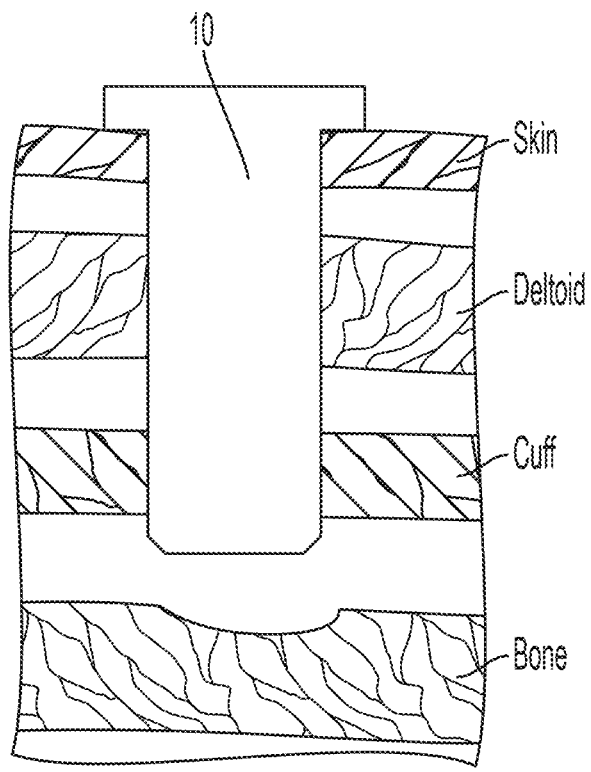
FIG. 1A illustrates a cross section of a first step of a conventional remplissage procedure for a rotator cuff.
Figure 1B:
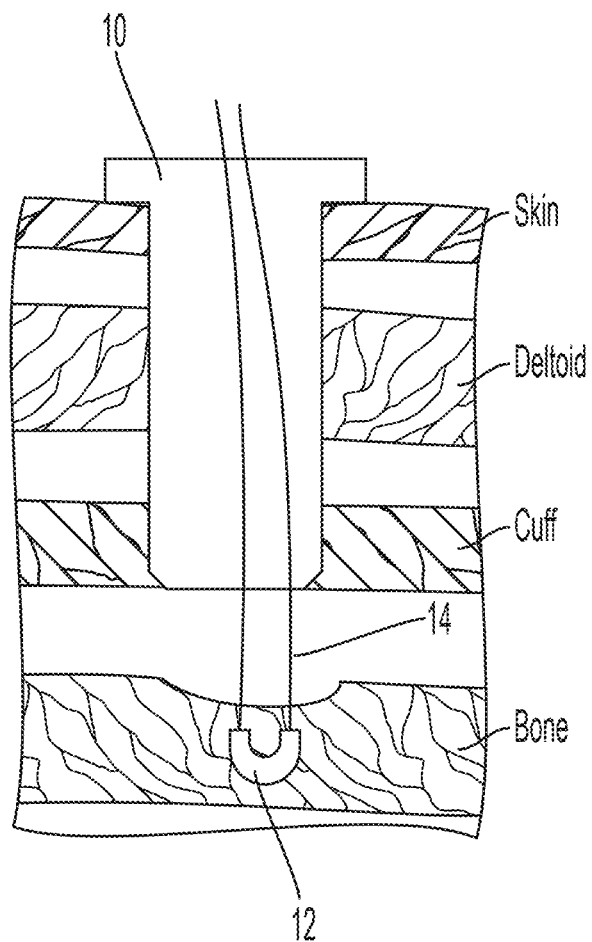
FIG. 1B illustrates a cross section of a second step of the conventional remplissage procedure.
Figure 1C:
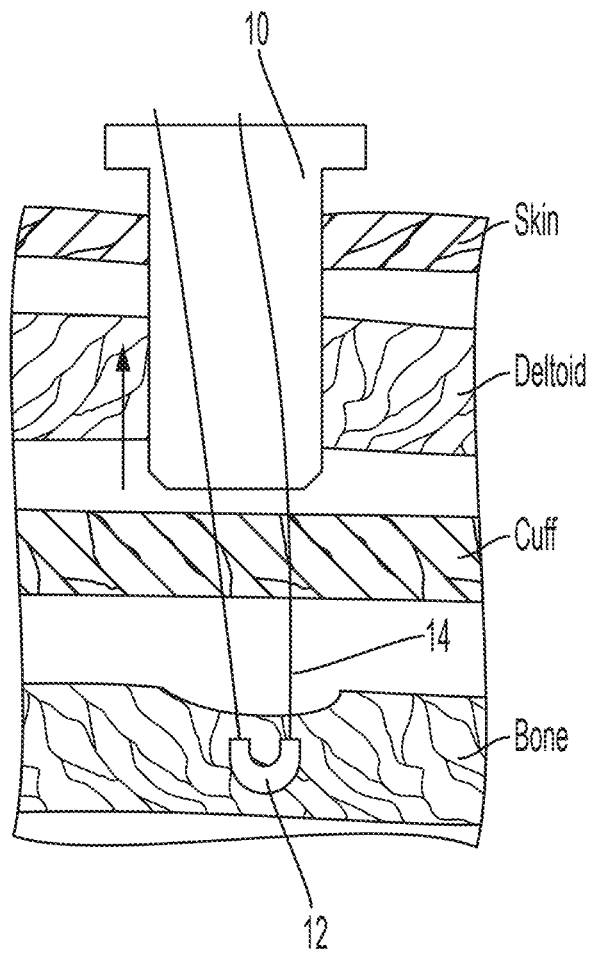
FIG. 1C illustrates a cross section of a third step of the conventional remplissage procedure.
Figure 1D:
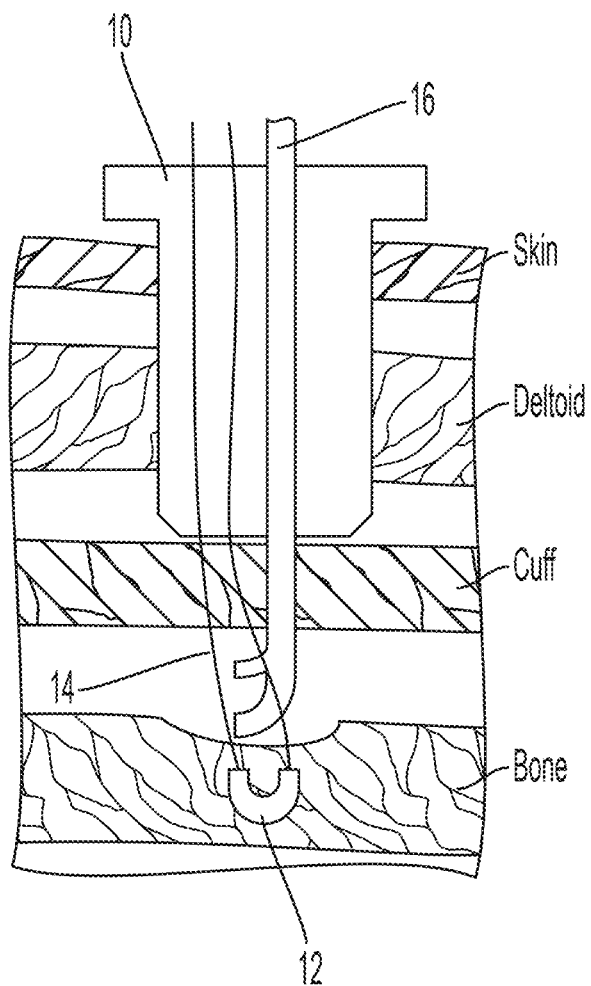
FIG. 1D illustrates a cross section of a fourth step of the conventional remplissage procedure.
Figure 1E:
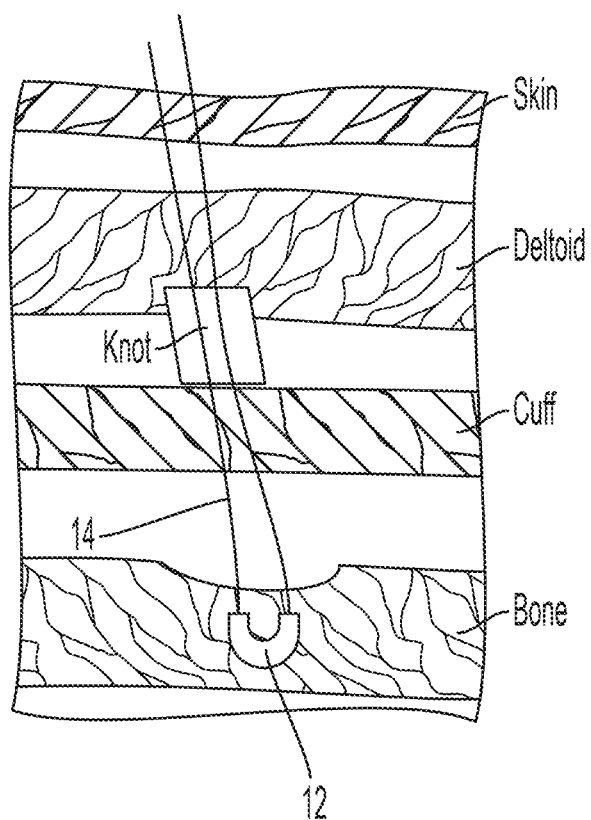
FIG. 1E illustrates a cross section of a fifth step of the conventional remplissage procedure.

The exemplary dimensions shown in the figures should be understood to be optional aspects, and various other dimensions are contemplated.

DETAILED DESCRIPTION

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "an anchor" includes one or more of such anchors, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," "approximately," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

It is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification. Thus, words denoting order, such as "first" or "next," should be interpreted as optional aspects unless plain meaning or logic dictates otherwise.

Disclosed herein, in various aspects and with reference to FIGS. 2A-3 and 6A-6F, is a cannula 100. As further described herein, it is contemplated that the disclosed cannula can enable a surgeon to precisely position two anchors in a bone. The disclosed cannula can further enable the surgeon to tighten down a suture that extends between the two anchors so that the suture extends across and against an outer surface of a soft tissue (e.g., rotator cuff) and entirely beneath the muscle (e.g., deltoid). Further, the disclosed cannula can be used with an assembly that comprises (prior to insertion into the patient) a suture that is coupled to and extends between the two anchors, thereby eliminating a need for the surgeon to tie a knot within the body of the patient. The cannula can further enable a surgeon to view from a single location (underneath the rotator cuff and not above) while knowing the positions of the two anchors and the suture.

The cannula 100 can comprise a main body portion 102 having an outer peripheral surface 104, a longitudinal axis 106 that extends through a center of the cannula, a transverse axis 108, a first end 110, and a second end 112, wherein the first end 110 and second end 112 are spaced along the longitudinal axis 106. In some aspects, the cannula 100 can have a length along the longitudinal axis from about 60 mm to about 100 mm (e.g., about 70 mm). Such a length can enable the cannula 100 to extend to a desired location within the surgical site for a shoulder surgery. The length can be selected based on the surgical procedure for which it is used. The cannula 100 can have a radially extending flange 114 positioned at the first end 110 of the main body portion 102. Optionally, the outer peripheral surface 104 can be textured (e.g., having projections (e.g., bumps) 105, ridges, etc.) to inhibit the cannula from moving (e.g., backing out) when inserted into a patient. Optionally, the outer peripheral surface 104 can be cylindrical or substantially cylindrical. In further aspects, the outer peripheral surface 104 can taper toward the second end 112. Optionally, the cannula 100 can comprise one or more polymer materials (e.g., polycarbonate). In further optional aspects, the cannula 100 can comprise metal. In further aspects, it is contemplated that the cannula 100 can be sterilizable using conventional methods.

A through-bore 120 can extend through the main body portion 102 from the first end 110 of the main body portion 102 to the second end 112 of the main body portion. In some aspects, the through-bore 120 can comprise a first guide bore 122 and a second guide bore 124 that are spaced along the transverse axis 108. Optionally, the first guide bore 122 and second guide bore 124 can be spaced between about 5 mm and about 7 mm along the transverse axis 108. This spacing can be selected based on the specific type of surgery being performed, how the cannula is to be used in surgery, or the amount of tissue desired to be pulled against the bone. It is contemplated that relatively larger spacing between the first and second guide bores can be preferable for overlaying a correspondingly larger length of rotator cuff or other soft tissue. The through-bore 120 can further comprise a connecting portion 126 that can extend between the first guide bore 122 and the second guide bore 124. As can be understood, the first and second guide bores 122, 124 and connecting portion 126 can define respective portions of through-bore 120. Optionally, the first and second guide bores can be cylindrical or generally cylindrical. In some aspects, the first and second guide bores 122, 124 can each have a diameter of from about 1 mm to about 2 mm, or about 1.5 millimeters. It is contemplated that the first and second guide bores can be configured to receive a surgical needle, a drill, and an anchor inserter of an all-suture anchor therethrough. The cross sectional dimensions (e.g., diameters) of the first and second guide bores can optionally be selected to have minimal clearance between the instruments inserted therethrough in order to precisely locate said instruments at the second end 112 of the main body portion 102. The connecting portion 126 can be can be sized to receive a suture therethrough. Accordingly, in some aspects, and with reference to FIG. 3, the connecting portion 126 can have a width, w, perpendicular to the transverse axis 108 that is less than the diameter of each of the first and second guide bores 122, 124. For example, optionally, the width w can be about 1 mm to about 2 mm, less than 2 mm, about 1 mm to about 1.5 mm, less than 1.5 mm, about 0.5 mm to about 1.25 mm, or less than 1 mm.

A tip portion 127 can extend from the second end 112 of the main body portion 102 along the longitudinal axis 106. The tip portion 127 can comprise a bore 128 therethrough that is coaxial with the first guide bore 122. Accordingly, in some aspects, it is contemplated that the tip portion 127 can be offset from the longitudinal axis 106 of the main body portion along the transverse axis 108 and centered at the first guide bore 122. The first guide bore 122 and bore 128 through the tip portion can optionally have the same dimension so that the through-bore 120 and bore 128 cooperatively extend continuously through the cannula 100, as shown in FIG. 2B. It is contemplated that the length of the tip portion 127 can be selected so that the tip portion extends at least partially (or, optionally, entirely) through soft tissue of the patient with the second end 112 of the main body portion 102 against an outer surface of the soft tissue. The cannula 100 can, therefore, enable a surgeon to know the position of the outer surface of the soft tissue (e.g., at and biasing against the second end 112 of the main body portion). In this way, and, as further disclosed herein, a suture can be placed to extend from the bone at a first anchor, entirely through the soft tissue to the outer surface of the soft tissue, but not through the adjacent muscle, and back through the soft tissue and anchored in the bone at a location spaced from the first anchor. Optionally, the tip portion 127 can extend between about 3 mm and about 10 mm or between about 4 mm and about 8 mm (e.g., optionally, 6 mm) from the second end 112 of the main body portion 102. In some aspects, the tip portion 127 can have a diameter of from 1 mm to 2 mm, or about 1.5 millimeters. The tip portion 127 can have an end 130 opposite the second end 112 of the main body portion 102. Optionally, the at least a portion of the tip portion 127 can be tapered moving toward the end 130. In combination, the first guide bore 122 and the bore 128 can define a continuous passage 129 from the first end 112 of the main body portion 102 to the end 130 of the tip portion 127. As can be understood and as shown in FIG. 2B, the bore 128 can be in communication with the connecting portion 126 to define the continuous passage 129 through the cannula 100 from the first end 112 of the main body portion 102 to the end 130 of the tip portion 127.

Referring also to FIGS. 6A-6F, the tip portion 127 can be a continuation of the main body portion 102. Accordingly, the main body portion 102 and tip portion can optionally be formed as a monolithic unitary structure 150. The main body portion 102 and tip portion 127 of the cannula can respectively define a first end 152 and a second end 154 of the cannula 100. The through-bore 120 and bore 128 can cooperatively extend continuously through the cannula 100 to define a cannula bore 156 that extends through the cannula 100 from the first end 152 of the cannula 100 to the second end 154 of the cannula. Accordingly, as can be understood, the through bore 120 and bore 128 can define respective portions of the cannula bore 156. The cannula bore 156 can define the second guide bore 124 that has a patient end 160. The cannula bore 156 can further define the bore 128 of the tip 127. The bore 128 can have a patient end 162 at the second end 154 of the cannula 100. It is contemplated that the patient end 162 of the bore 128 can be spaced from the patient end 160 of the guide bore 124 along the longitudinal axis 106 (e.g., by the length of the tip portion).

The tip portion 127 can optionally be defined as a taper from the second end 112 of the main body portion 102 to the end 130 of the tip portion. For example, at least a portion of an outer surface of the tip portion 127 can be spaced along the transverse axis 108 from the longitudinal axis 106 by the same distance as a portion of the outer surface 104 of the main body portion 102. Optionally, at least a portion of the tip portion can be arcuate from the second end 112 of the main body portion 102.

The cannula 100 as disclosed herein can be used to surgically attach soft tissue (e.g., a rotator cuff 202) to bone 204 of a patient. FIGS. 4A-4G illustrate steps of a method for attaching a rotator cuff 202 (soft tissue) to the bone 204 of a patient. Although the devices and methods shown herein are described in reference to attaching a rotator cuff to bone in a shoulder, in various aspects, the devices and methods can be used or adapted for use in surgery for various other tendon, ligament, and soft tissues. For example, the devices and methods disclosed herein can be used for labral repair.

Figure 2A:
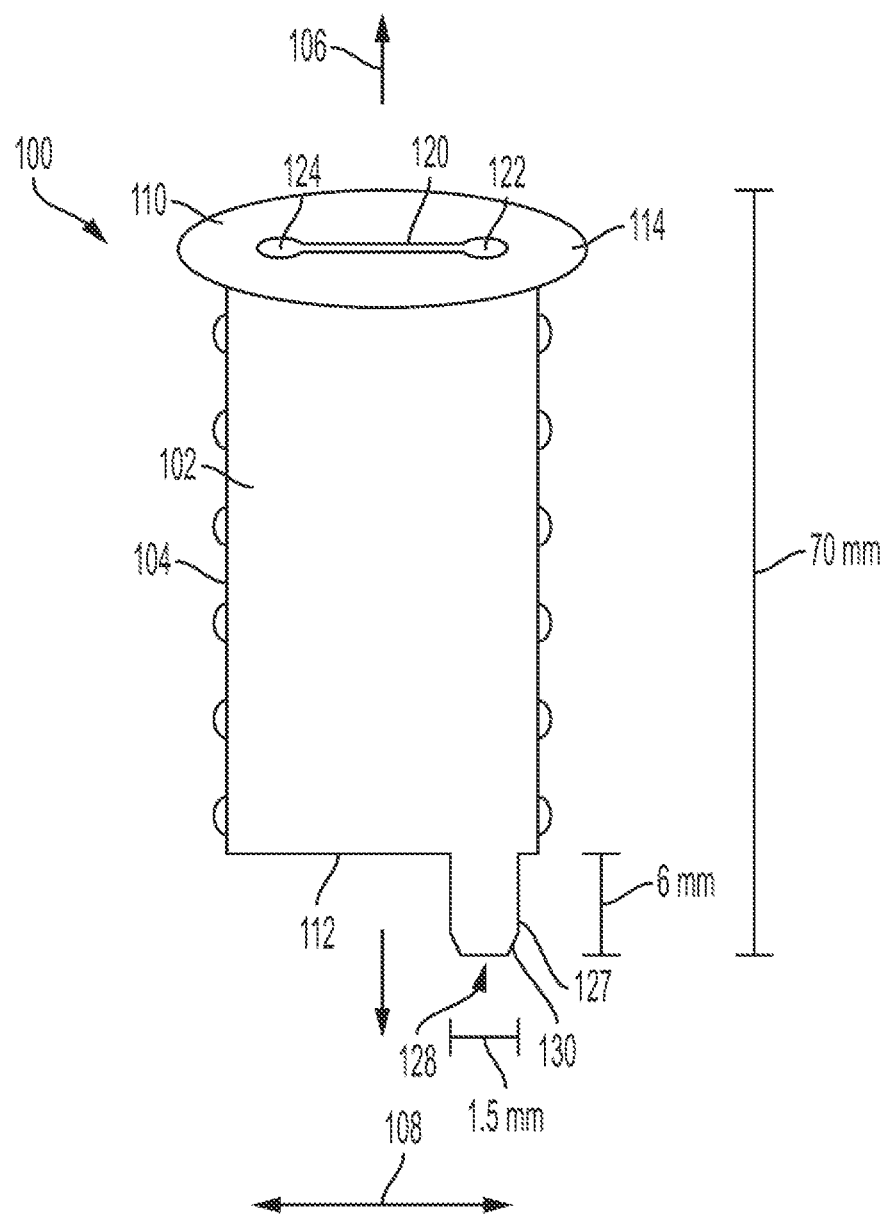
FIG. 2A is a side perspective view of a cannula in accordance with embodiments disclosed herein.
Figure 2B:
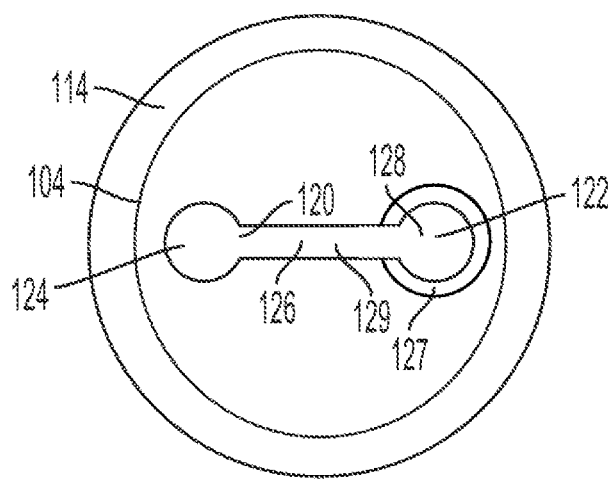
FIG. 2B is a bottom (patient) end view of the cannula of FIG. 2A
Figure 2B:
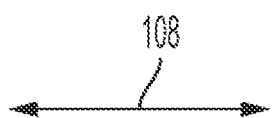
Figure 3:
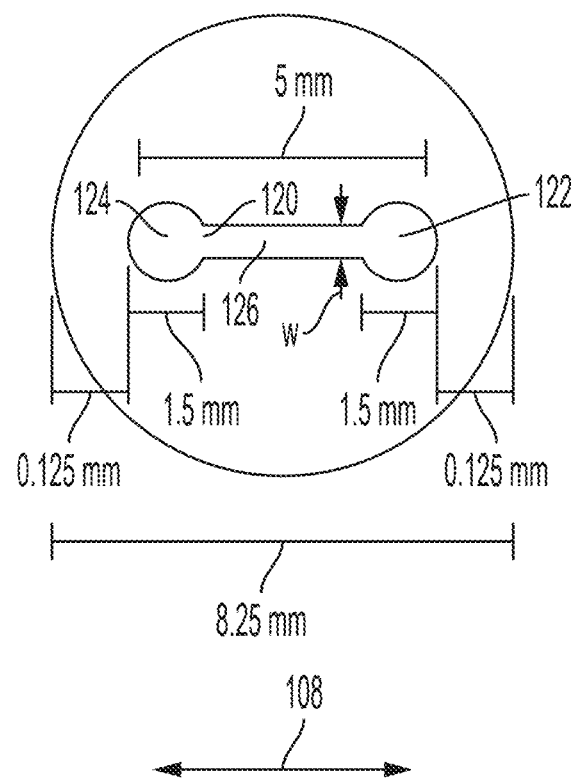
FIG. 3 is a cross sectional view of the cannula of FIG. 2 taken in a plane that is perpendicular to a longitudinal axis of the cannula.
Figure 4A:
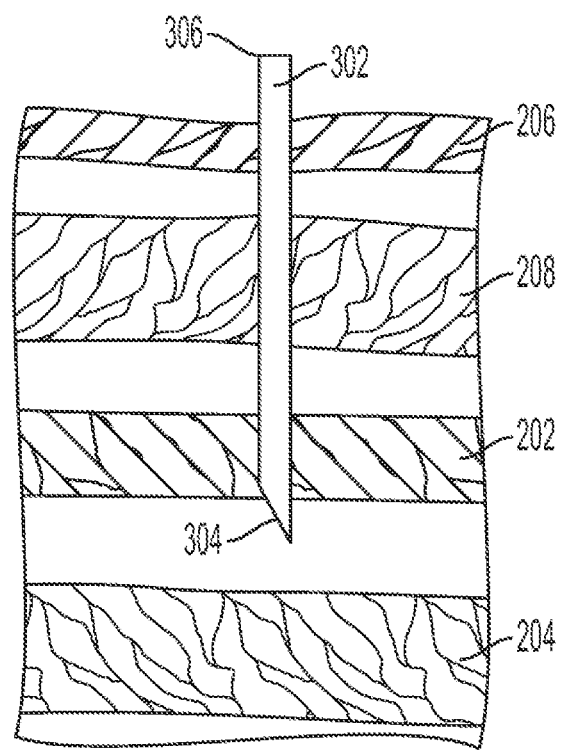
FIG. 4A illustrates a cross section of a first step of a remplissage procedure with the cannula as in FIG. 2A.

Referring to FIGS. 2A and 4A, in some aspects, a spinal needle or sharp trocar 302 can be used to localize a first suture anchor (e.g., at the position outside the bone for drilling a bore to receive the first suture anchor). For example, the spinal needle or sharp trocar 302 can be inserted through skin 206 and a deltoid 208 to a desired depth at a desired position on the bone 204. The position of the spinal needle or sharp trocar 302 can be posited via an outside-in technique with localization.

Figure 4B:
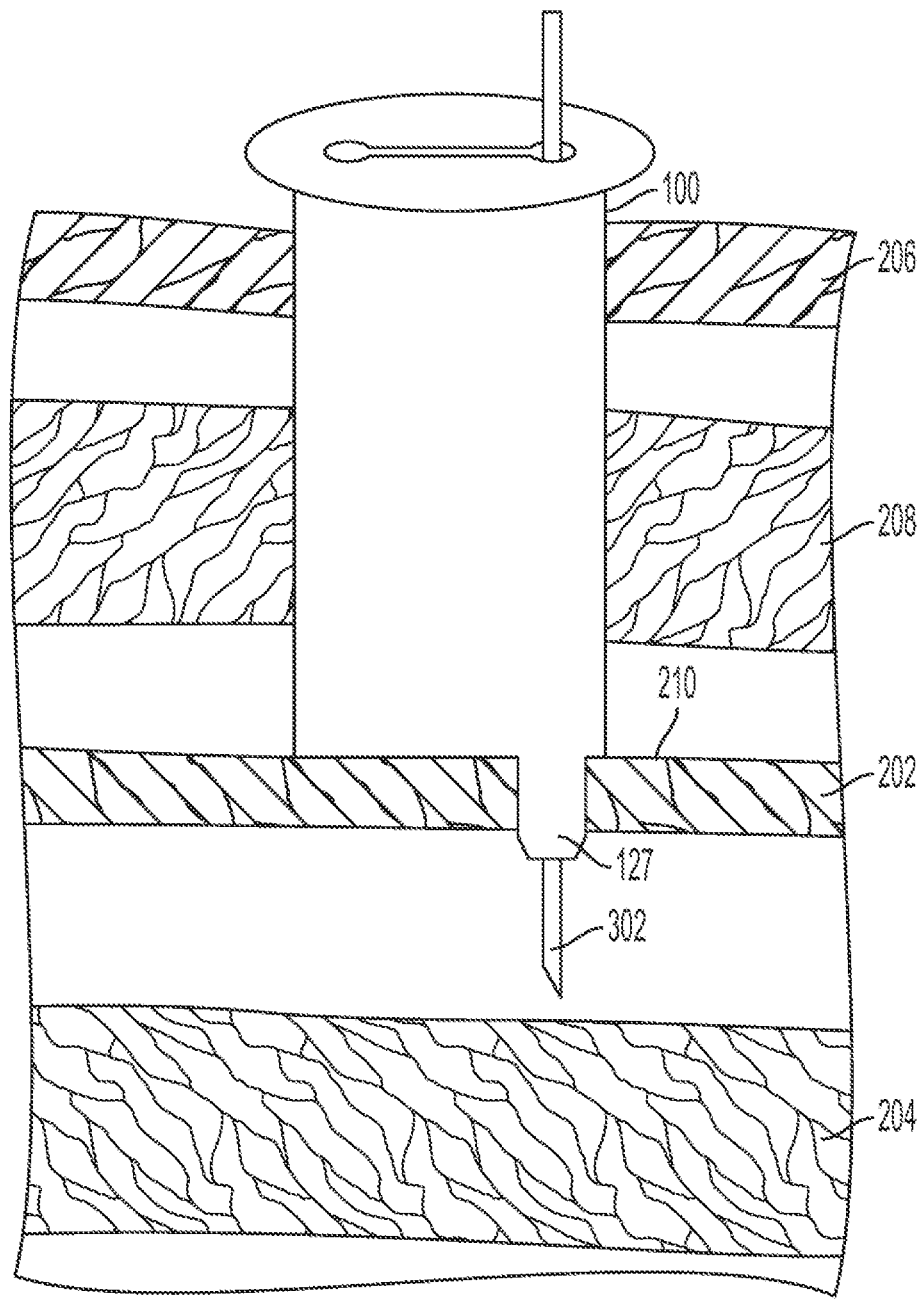
FIG. 4B illustrates a cross section of a second step of the remplissage procedure.

Referring to FIGS. 2A and 4B, the cannula 100 can be inserted over the spinal needle or sharp trocar 302. A scalpel can be used to incise skin in order to provide an opening to receive the cannula 100. For example, the spinal needle or sharp trocar 302 can have an insertion end 304 and a back end 306, and the cannula 100 can be inserted, tip portion 127 first, over the back end 306 so that the spinal needle or sharp trocar 302 is within the first guide bore 122. The tip portion 127 can be inserted through a hole in the cuff 202 that is originally formed by the spinal needle or sharp trocar 302. The end 130 of the tip portion 127 can be shaped (optionally, tapered) to facilitate insertion of the tip portion 127 of the cannula 100 through the cuff 202. The second end 112 of the main body portion 102 can bias against an outer surface 210 of the cuff 202.

Figure 4C:
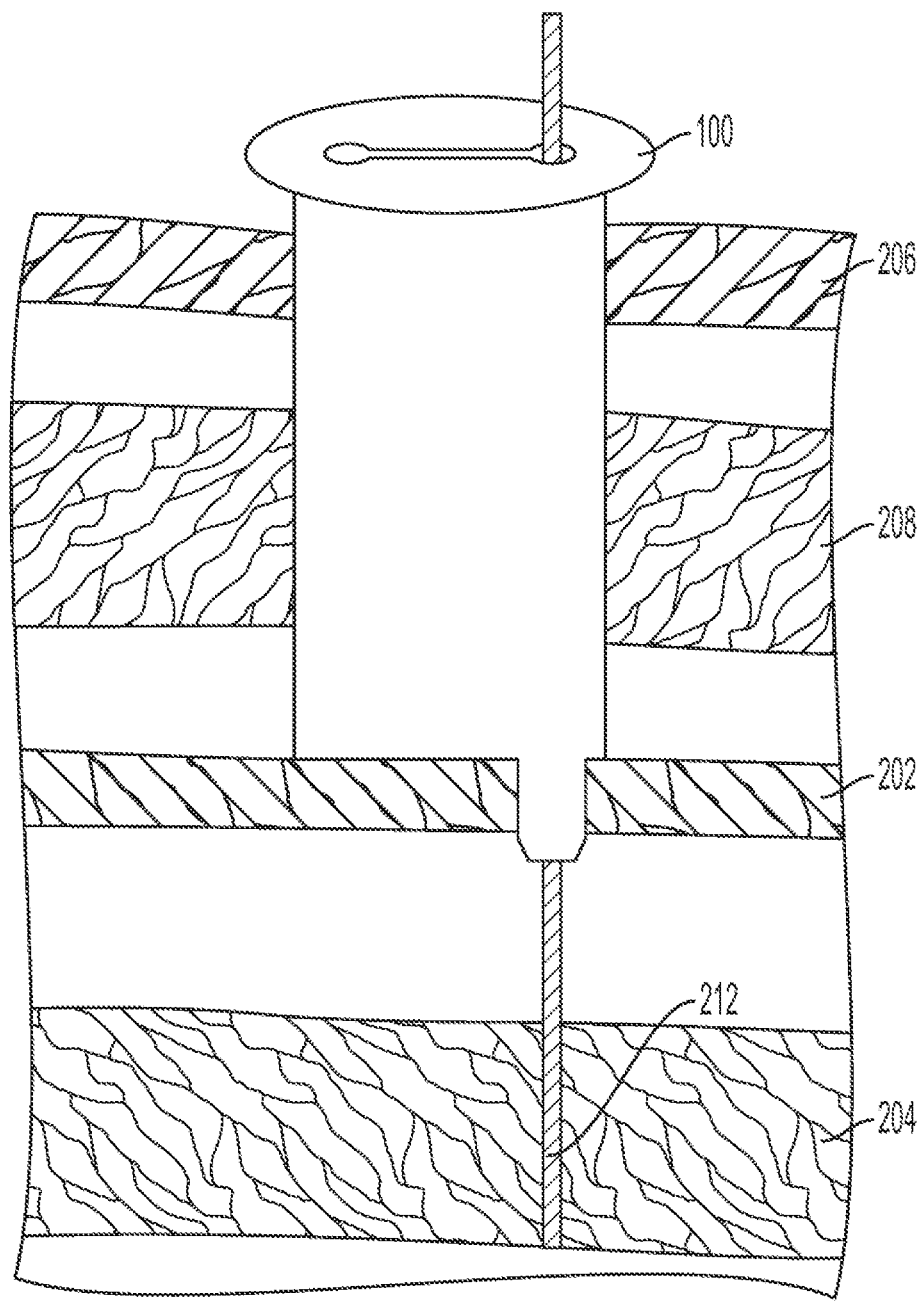
FIG. 4C illustrates a cross section of a third step of the remplissage procedure.

Referring to FIGS. 2A and 4C, once the tip portion 128 of the cannula 100 is inserted into the cuff, a first anchor site 212 can be drilled. The first guide bore 122 of the cannula 100 can guide the drill when forming the first anchor site 212.

Figure 4D:
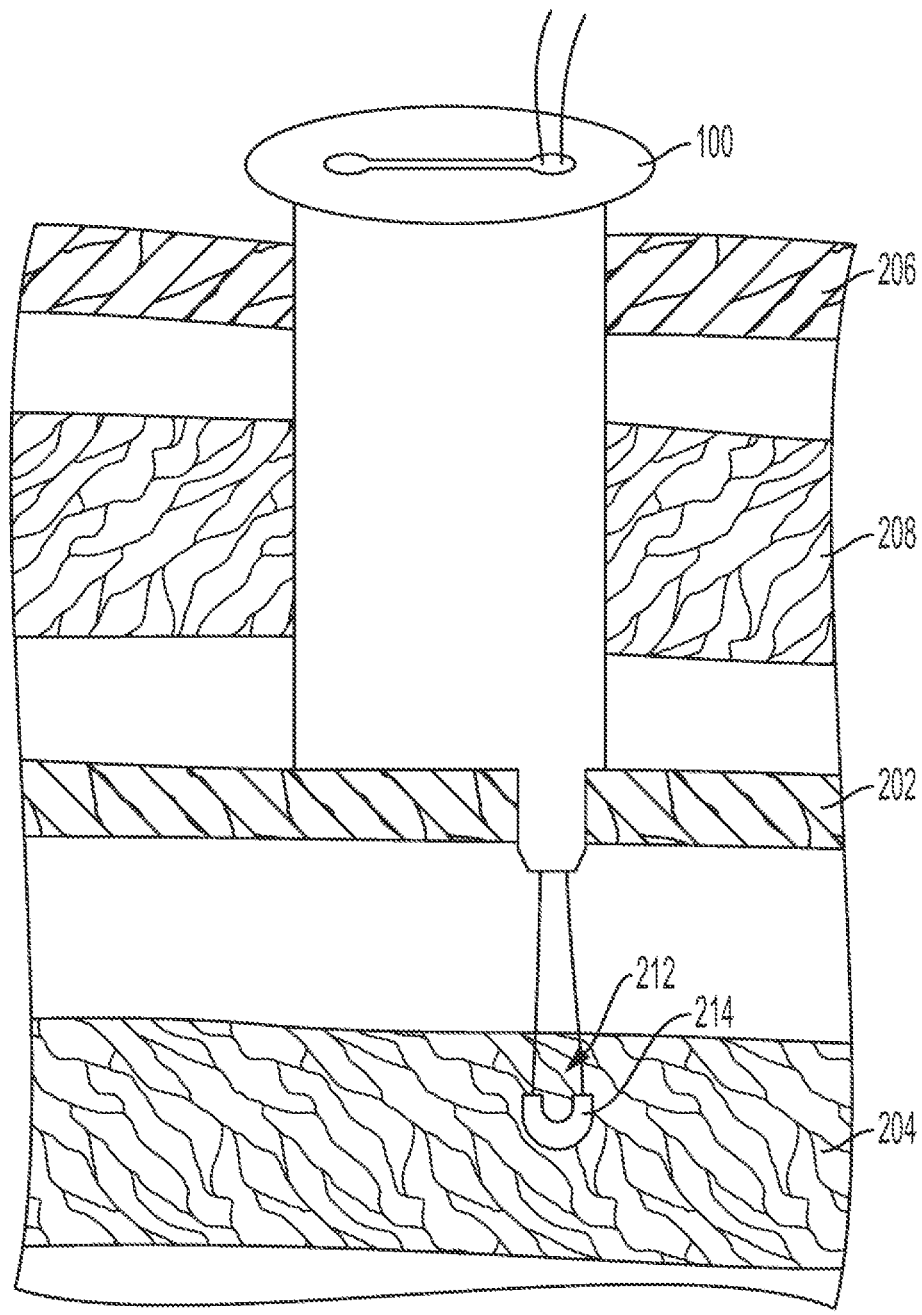
FIG. 4D illustrates a cross section of a fourth step of the remplissage procedure.

Referring to FIGS. 2A and 4D, the drill can be removed from the cannula, and a first all-suture anchor 214 can be inserted into the drilled first anchor site 212 and anchored therein.

Figure 4E:
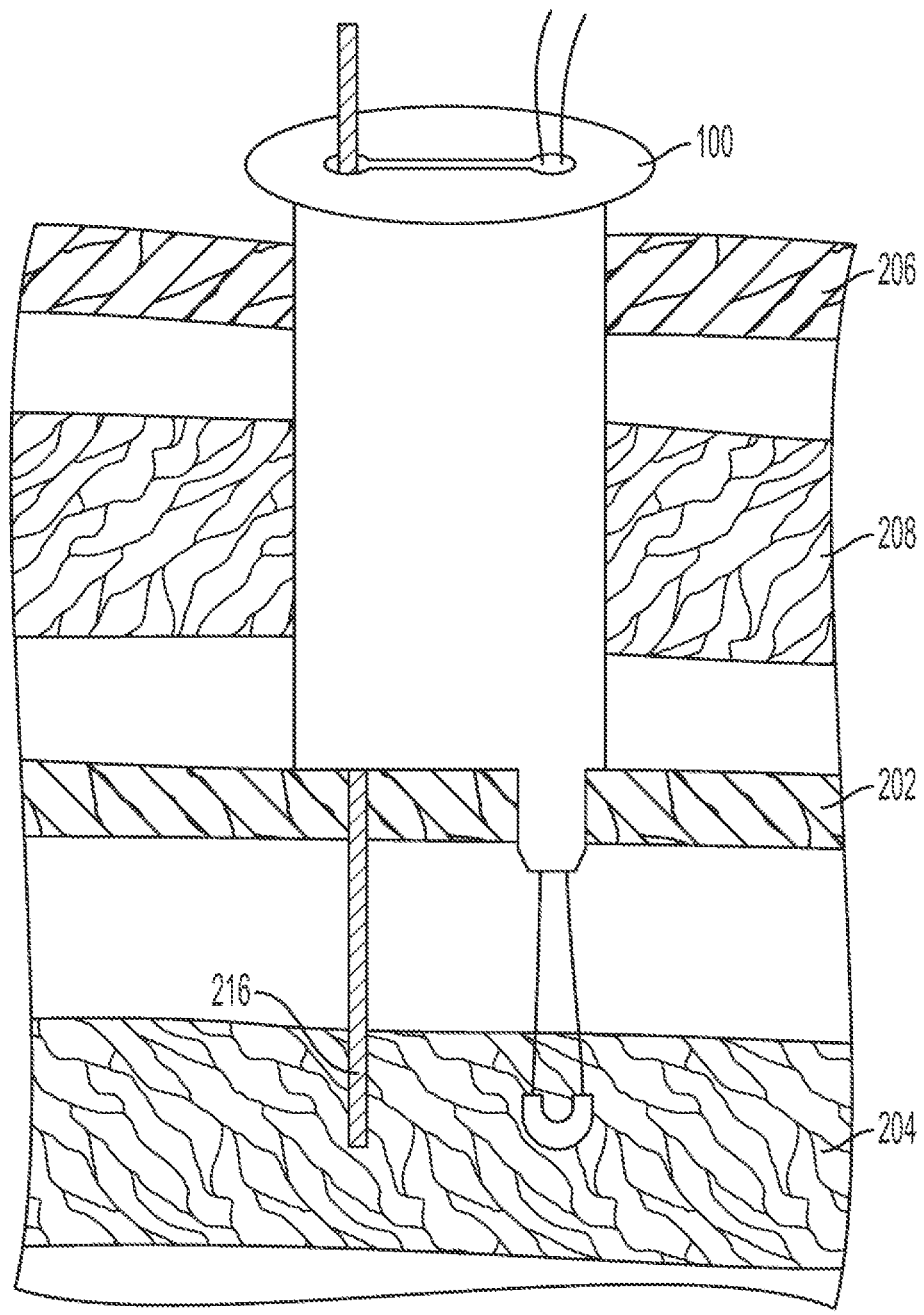
FIG. 4E illustrates a cross section of a fifth step of the remplissage procedure.

Referring to FIGS. 2A and 4E, the second guide bore 124 can be used to guide a drill to form a second anchor site 216. Accordingly, the spacing along the transverse axis 108 between the first and second guide bores 122, 124 can determine the spacing between the first and second anchor sites 212, 216.

Figure 4F:
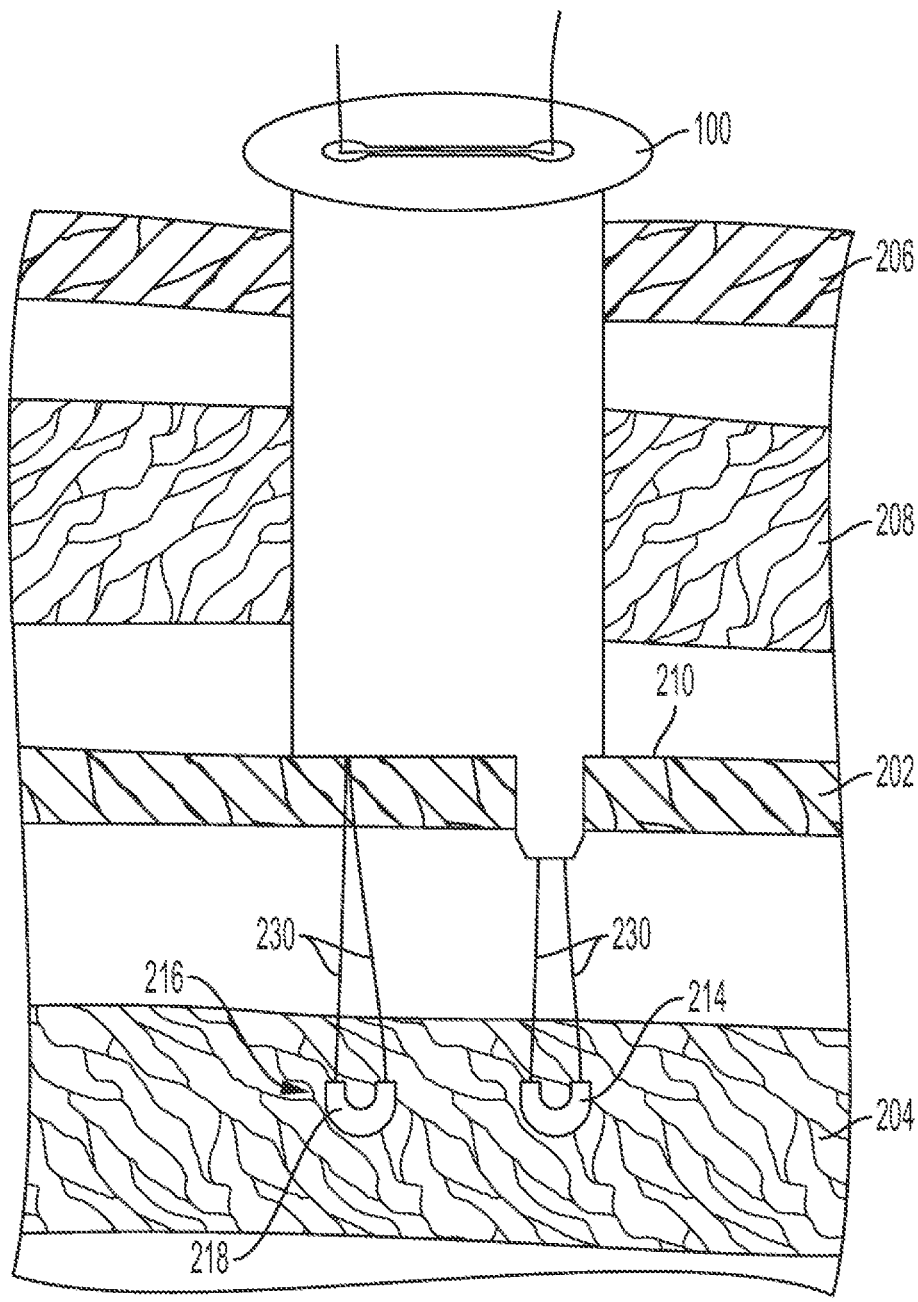
FIG. 4F illustrates a cross section of a sixth step of the remplissage procedure.

Referring to FIGS. 2A and 4F, the drill can be removed, and a second all-suture anchor 218 can be inserted into the second anchor site 216 and anchored therein.

Figure 4G:
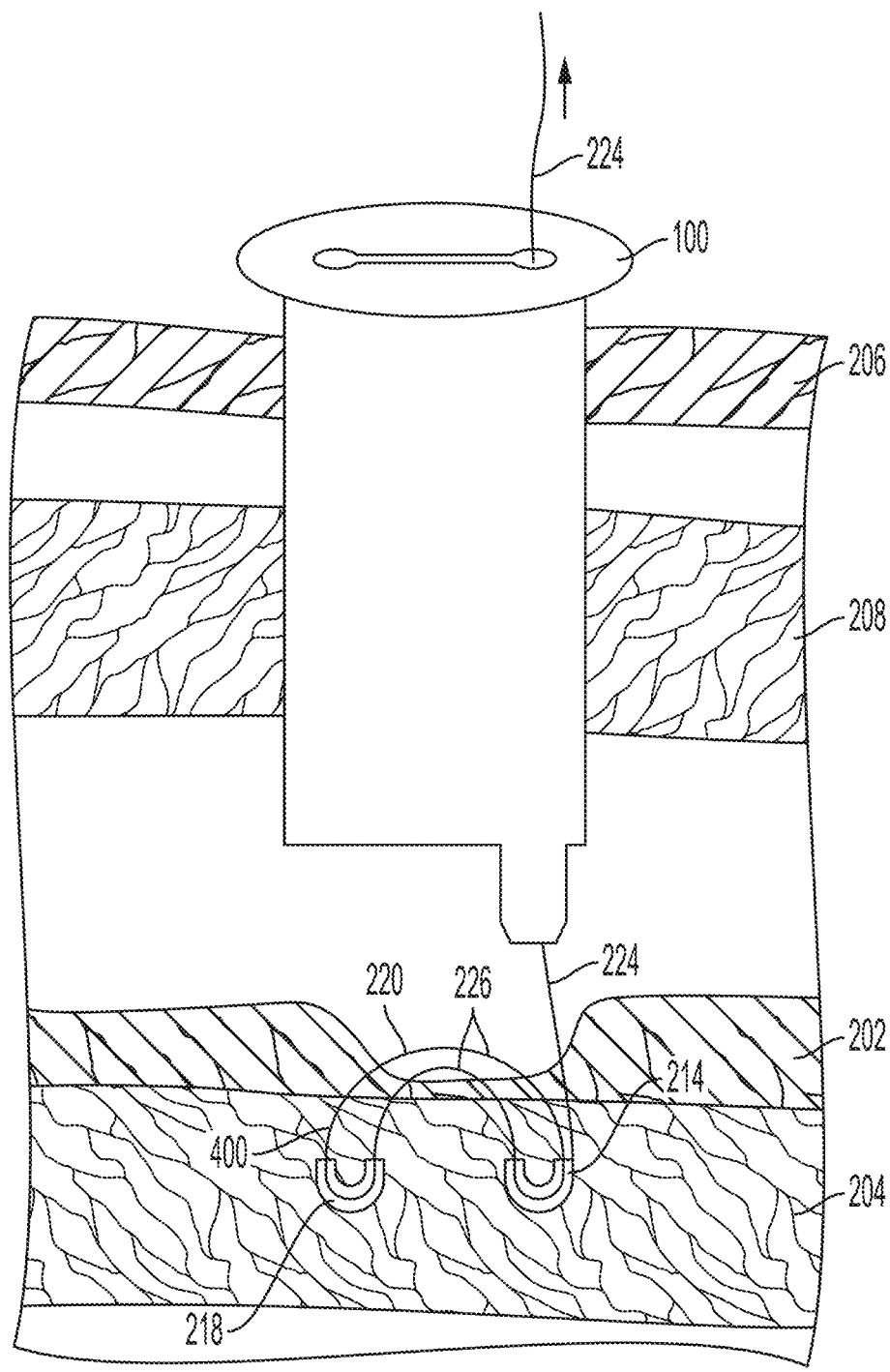
FIG. 4G illustrates a cross section of a seventh step of the remplissage procedure.
Figure 5:
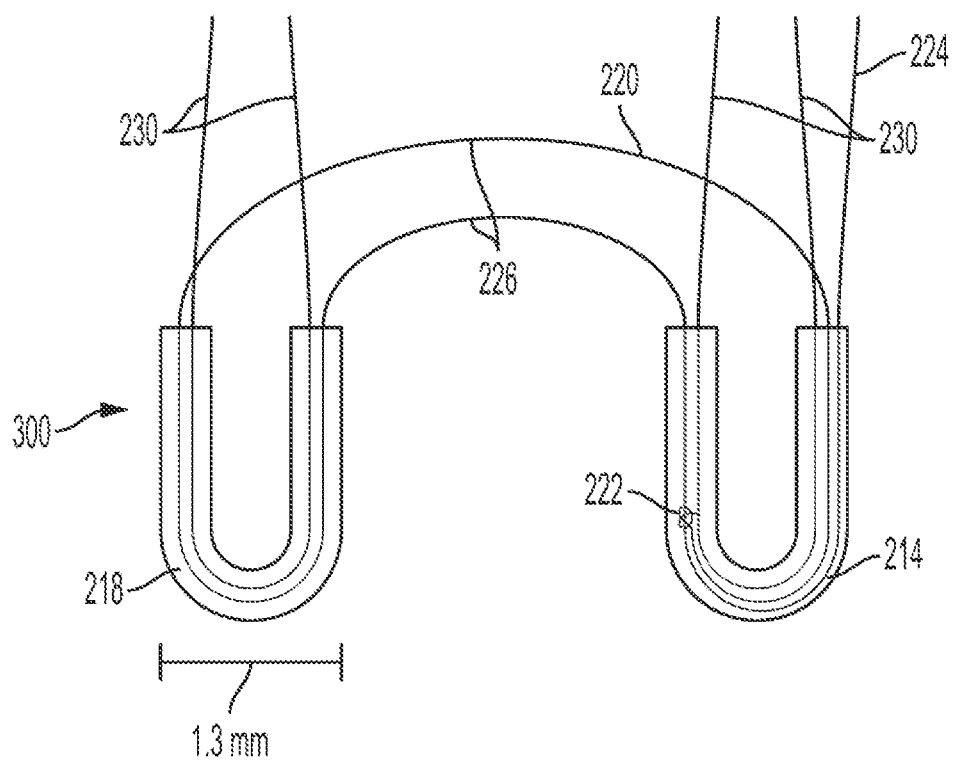
FIG. 5 is a schematic diagram of a suture tied using the cannula as disclosed herein.
Figure 6A:
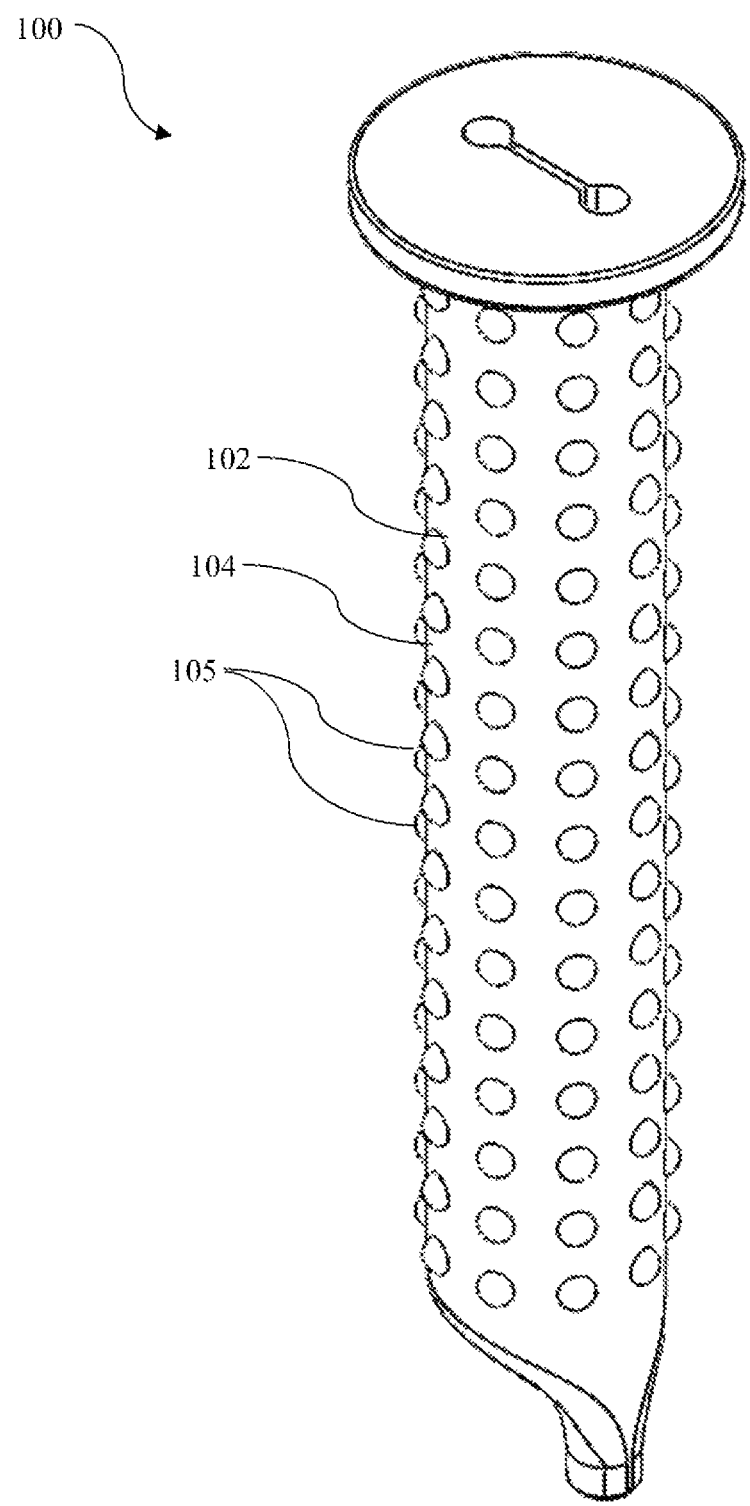
FIG. 6A is a perspective view of an exemplary cannula as disclosed herein.
Figure 6B:
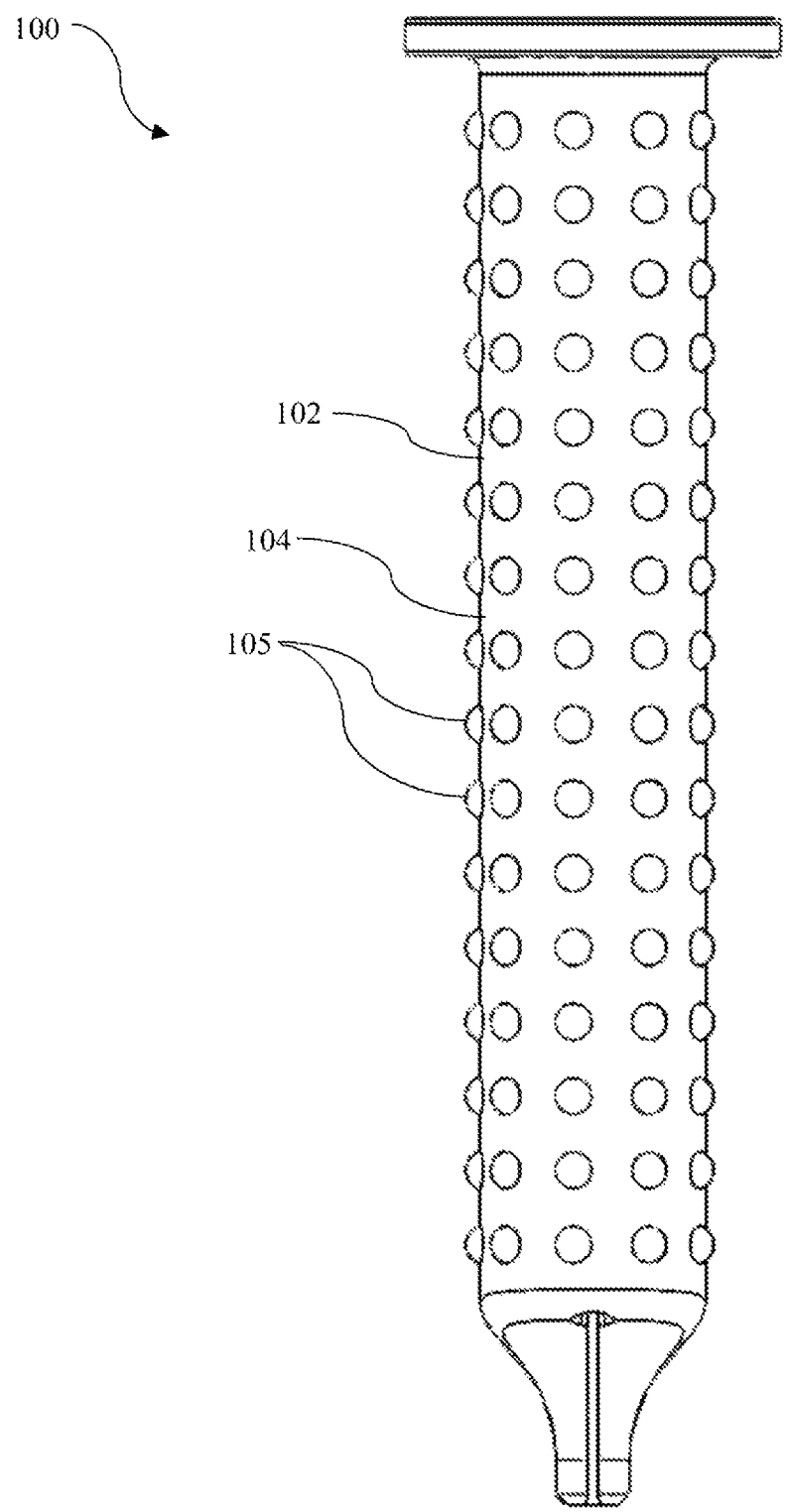
FIG. 6B is a front view of the cannula of FIG. 6A.
Figure 6C:
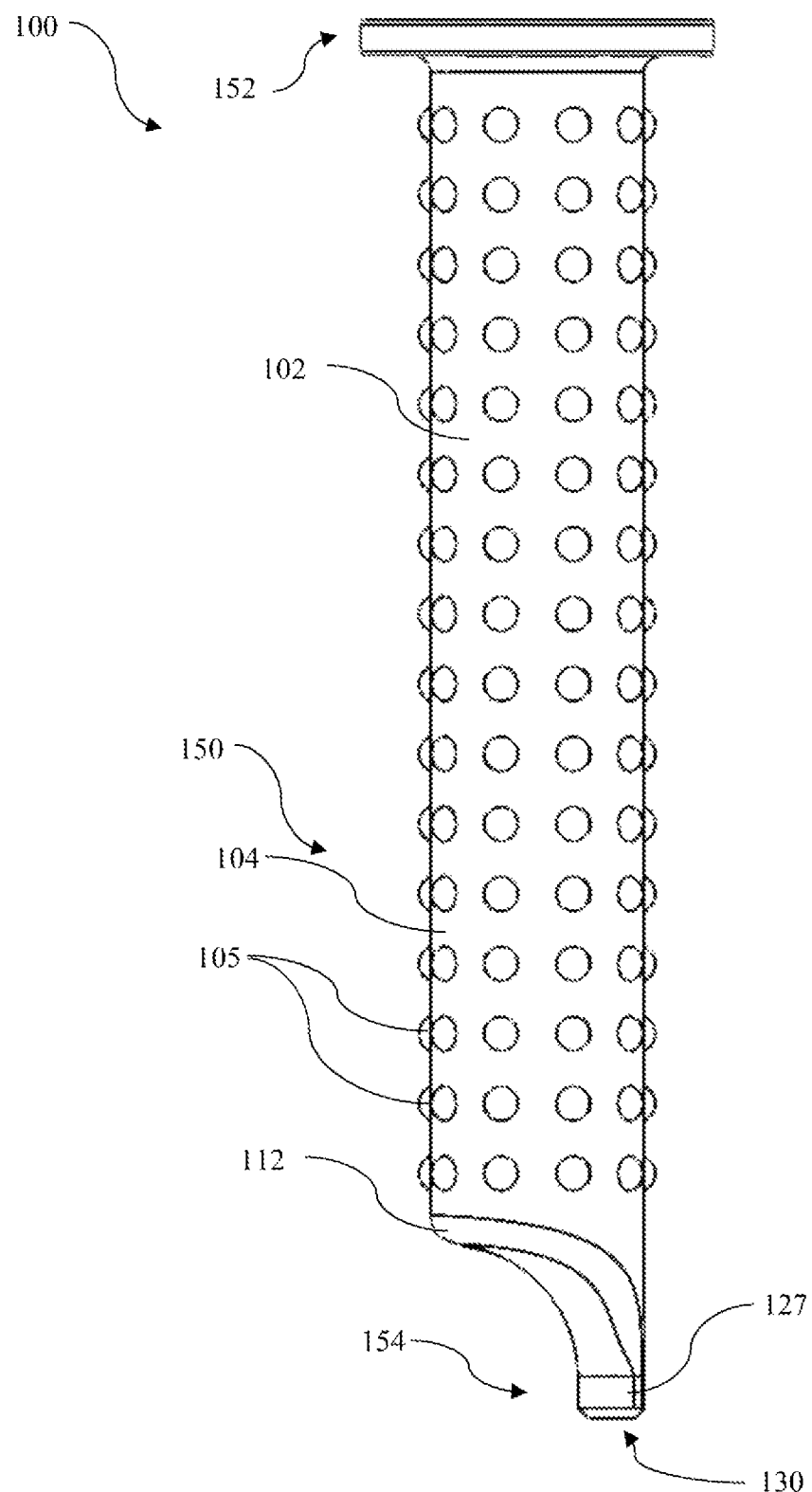
FIG. 6C is a side view of the cannula of FIG. 6A.
Figure 6D:
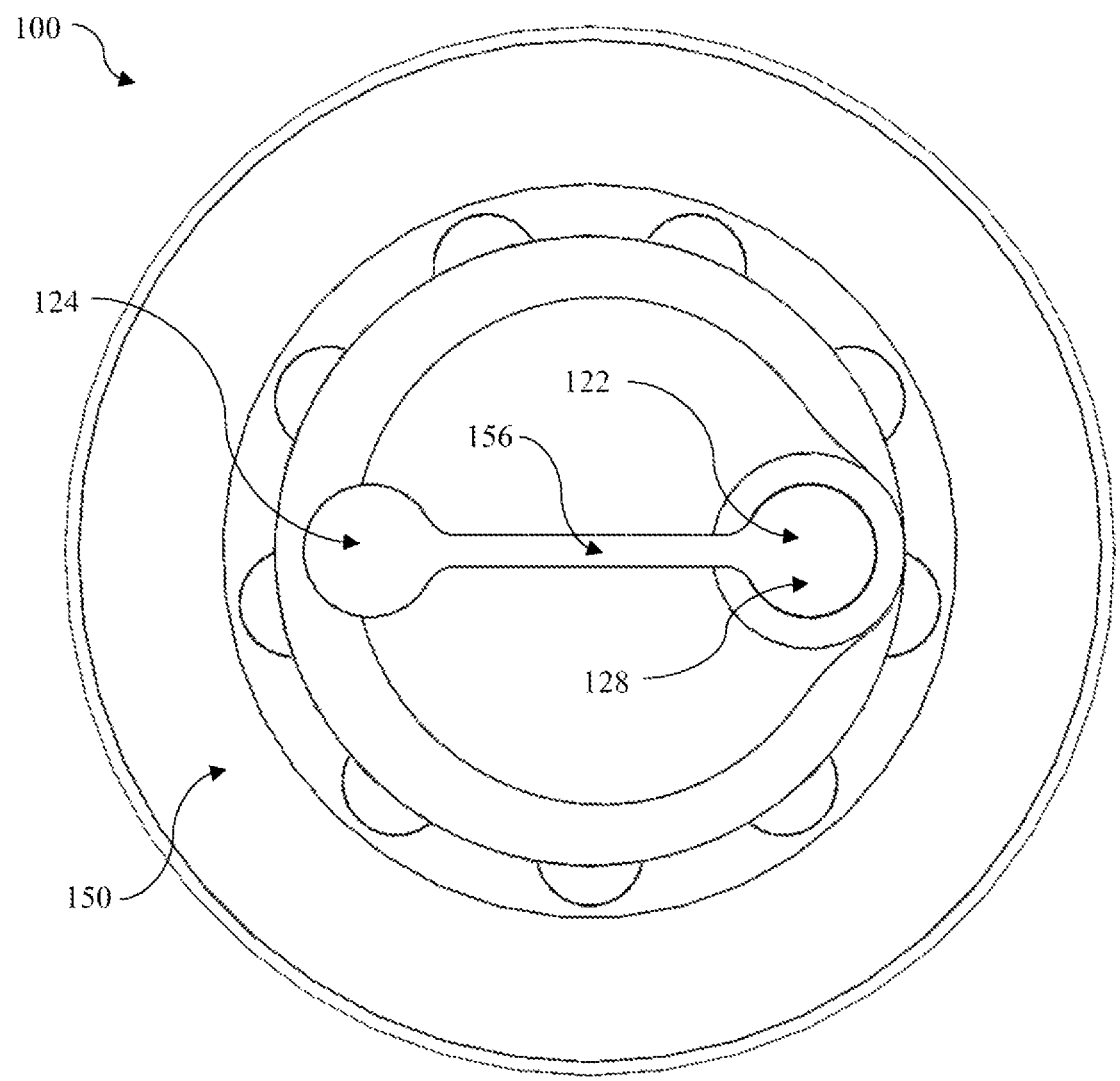
FIG. 6D is a bottom (patient) end view of the cannula of FIG. 6A.
Figure 6E:
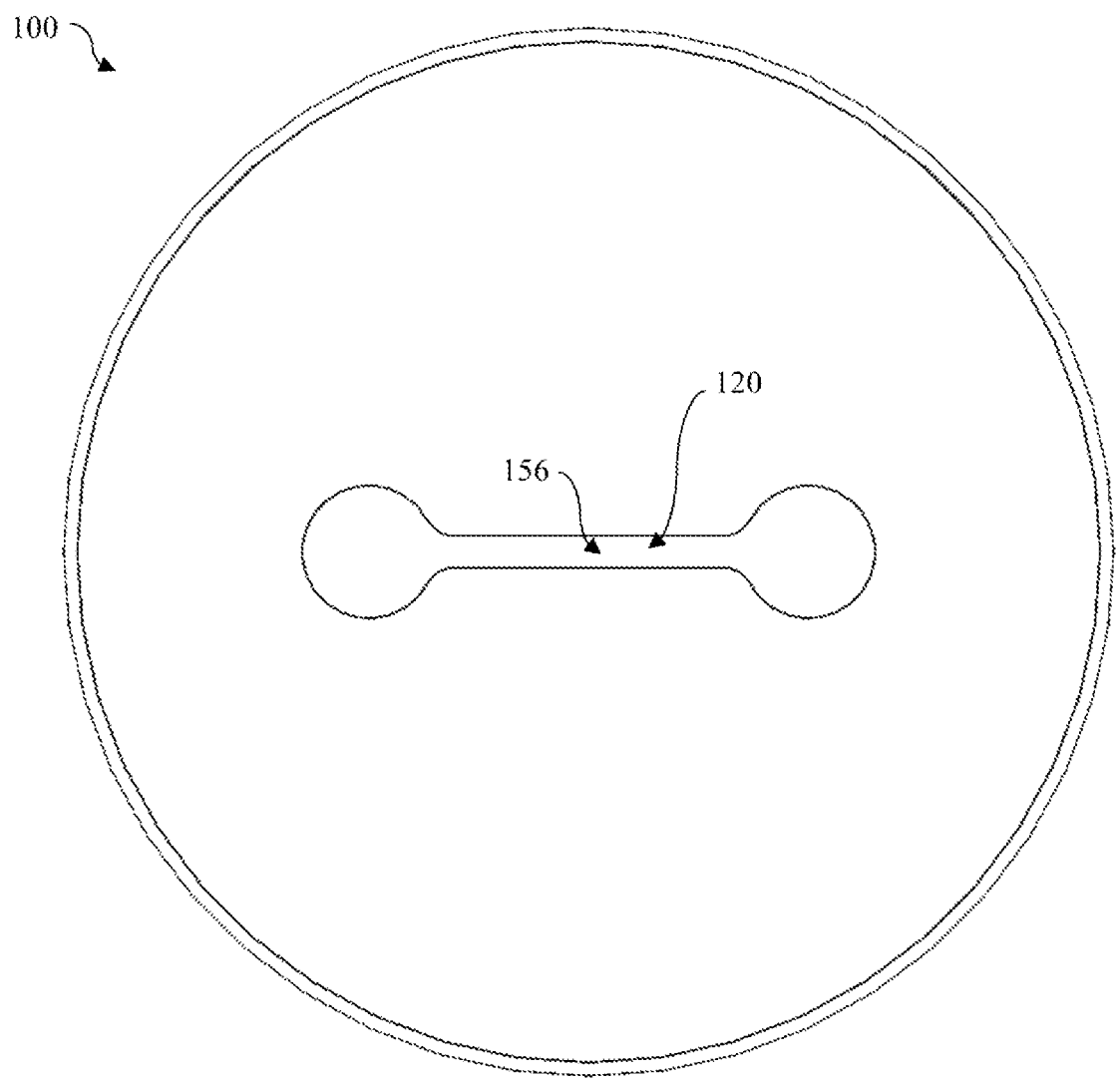
FIG. 6E is a top (surgeon) end view of the cannula of FIG. 6A.
Figure 6F:
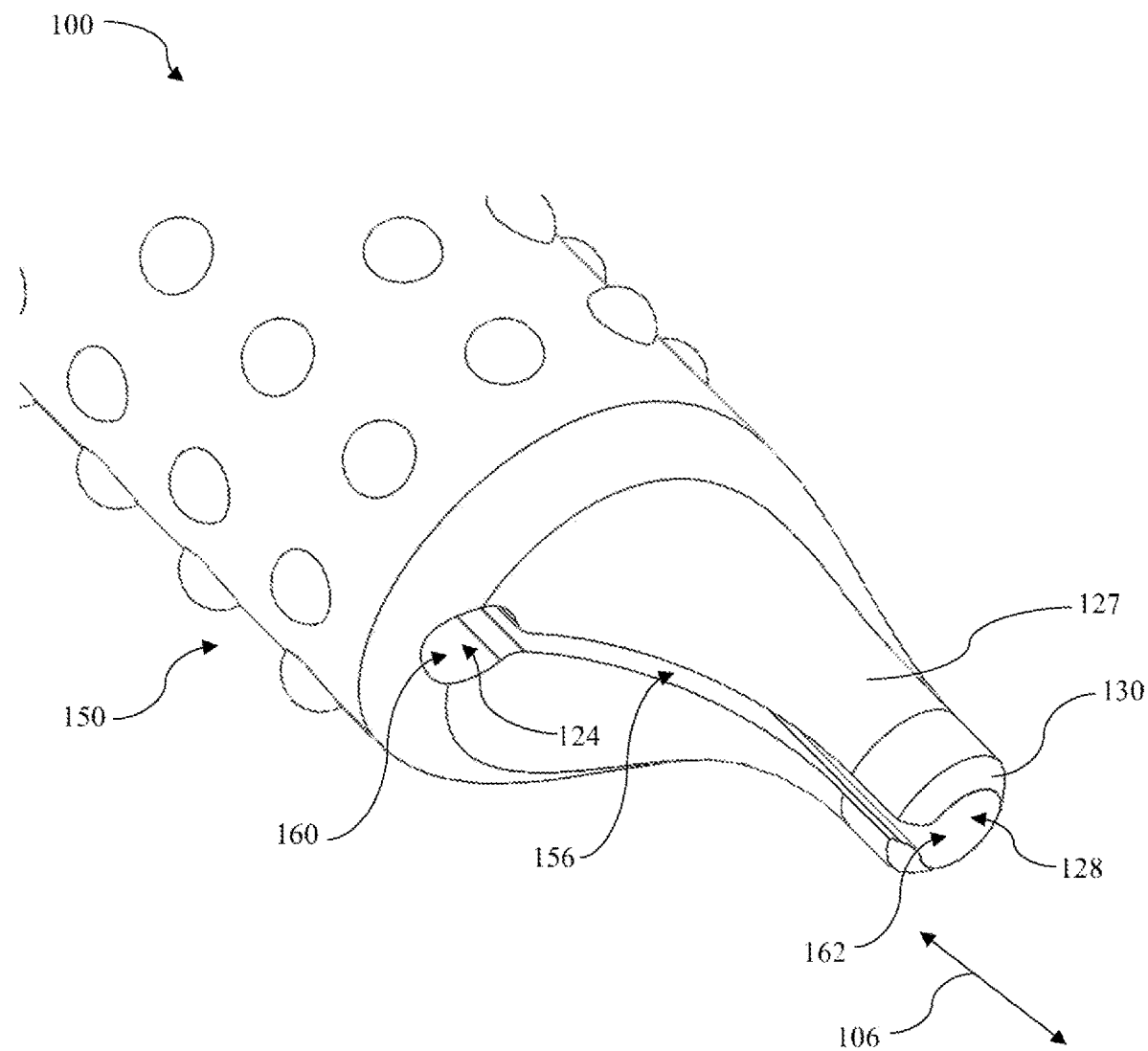
FIG. 6F is a partial perspective view of a bottom end of the cannula of FIG. 6A.

Referring to FIGS. 4G and 5, a suture (e.g., a looped suture) 220 can be connected to the first all-suture anchor 214 and the second all-suture anchor 218. For example, the looped suture 220 can be inserted into or otherwise attached to the first all-suture anchor 214 and then the second all-suture anchor 218. The looped suture 220 can optionally comprise a sliding locking knot 222. The sliding locking knot 222 can optionally be positioned within one of the all-suture anchors. Accordingly, optionally, the looped suture 220 can comprise a sliding locking knot 222 at a first end (optionally, within the one all-suture anchor) and can extend from one all-suture anchor, back to the other all-suture anchor, through the sliding locking knot 222, and terminate at a second end. The looped suture 220 can therefore comprise a free end 224 and two connecting portions 226 that extend between the two all-suture anchors.

In this way, the free end 224, when pulled, can shorten connecting portions 226 of the looped suture 220. Because the first and second guide bores 122, 124 (and bore 128 within the tip portion) are connected via a connecting portion 126 of the through-bore 120, the connecting portions 226 of the looped suture 220 can extend therethrough as slack in the looped suture 220 is removed. Moreover, because the second end 112 of the main body portion 102 of the cannula 100 is biasing against the outer surface 210 of the rotator cuff 202, the suture tied therethrough can be outside the cuff and against the outer surface of the rotator cuff, yet beneath the deltoid 208. Further, this method can obviate the need for the surgeon to tie a knot within the body of the patient, which can be difficult and imprecise.

Each all-suture anchor can have free sutures 230 that are used to set the anchors. The free sutures 230 can optionally be removed (e.g., pulled out or cut).

Figure 7:
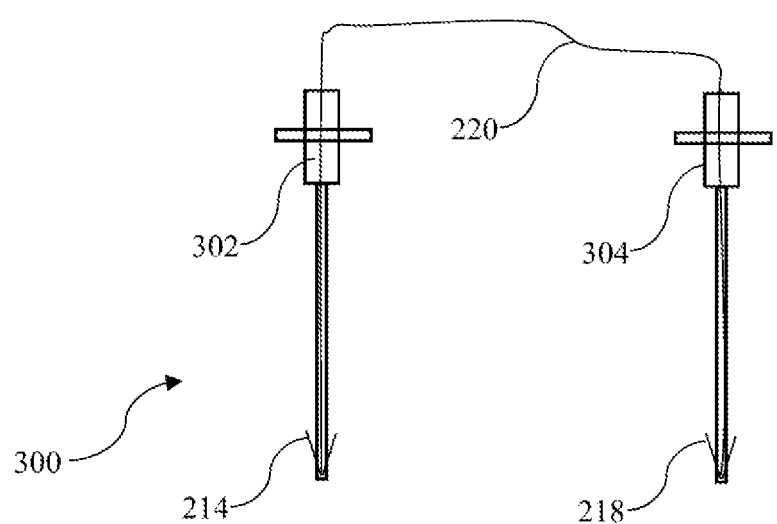
FIG. 7 is a schematic diagram of an assembly comprising first and second anchors having respective anchor inserters operatively coupled thereto and a suture extending between the first and second anchors.

It is contemplated that the cannula 100 can be configured for use with an assembly 300 comprising the first all-suture anchor 214, the second all-suture anchor 218, and the suture 220 coupled to and extending between the first all-suture anchor and second all-suture anchor. That is, prior to implantation of either of the all-suture anchors into the bone, the first all-suture anchor 214, the second all-suture anchor 218, and the looped suture 220 can be provided as a coupled assembly. In this way, the surgeon need not couple the first and second all-suture anchors 214, 218. Optionally, prior to insertion and implantation into the bone, the first all-suture anchor and second all-suture anchor can be operatively coupled to respective anchor inserters. In some exemplary aspects, and as shown in FIG. 7, the assembly 300 can further comprise a first anchor inserter 302 operatively coupled to the first all-suture anchor 214 and a second anchor inserter 304 operatively coupled to the second all-suture anchor 218. In still further aspects, the suture can optionally define a loop.

According to some aspects, a kit can comprise the cannula and the assembly 300. The kit can further comprise a needle that is configured to extend through the first guide bore for threading the surgical thread through the anchors.

EXEMPLARY ASPECTS

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A cannula comprising: a main body portion having an outer peripheral surface, a longitudinal axis, a transverse axis that is perpendicular to the longitudinal axis, and opposing first and second ends spaced along the longitudinal axis; a through-bore that extends through the main body portion from the first end of the main body portion to the second end of the main body portion, wherein the through-bore comprises a first guide bore, a second guide bore spaced from the first guide bore along the transverse axis, and a connecting portion that extends between the first guide bore and the second guide bore; and a tip portion that extends from the second end of the main body portion along the longitudinal axis, wherein the tip portion comprises a bore therethrough that is coaxial with the first guide bore.

Aspect 2: The cannula of aspect 1, wherein each of the first and second guide bores is generally cylindrical and has a diameter.

Aspect 3: The cannula of aspect 2, wherein the connecting portion of the through-bore has a width that is less than the diameter of each of the first and second guide bores.

Aspect 4: The cannula of aspect 2 or aspect 3, wherein the diameter of each of the first and second guide bores is between 1 mm and 1.5 mm Aspect 5: The cannula of any one of the preceding aspects, wherein the tip portion extends between about four mm and about ten mm from the second end of the main body portion.

Aspect 6: The cannula of any one of the preceding aspects, wherein the main body portion comprises a flange at the first end.

Aspect 7: The cannula of any one of the preceding aspects, wherein the tip portion is offset from a center of the main body portion along the transverse axis.

Aspect 8: The cannula of any one of the preceding aspects, wherein the outer peripheral surface of the main body portion is textured.

Aspect 9: The cannula of any one of the preceding aspects, wherein the cannula has a length along the longitudinal axis of between about 40 and about 80 millimeters.

Aspect 10: The cannula of aspect 9, wherein the cannula has a length along the longitudinal axis of about 70 millimeters.

Aspect 11: The cannula of any one of the preceding aspects, wherein the first and second guide bores are spaced apart by about 5 millimeters to about 7 millimeters along the transverse axis.

Aspect 12: A method of using a cannula as in any one of aspects 1-11 to attach a soft tissue to a bone at a surgical site, the method comprising: inserting a guide needle into the surgical site; inserting the cannula into the surgical site over the guide needle with the guide needle in the first guide bore so that the tip portion of the cannula extends at least partially through the soft tissue; removing the guide needle from the cannula; forming a first anchor site into the bone through the first guide bore; inserting a first anchor into the first anchor site; forming a second anchor site into the bone through the second guide bore; inserting a second anchor into the second anchor site; inserting a surgical thread into the first anchor through the first guide bore; and inserting the surgical thread into the second anchor through the second guide bore.

Aspect 13: The method of aspect 12, further comprising: tying a sliding locking knot; and tightening the surgical thread to pull the soft tissue against the bone.

Aspect 14: The method of aspect 12 or aspect 13, wherein inserting the first anchor into the first anchor site comprises pulling on a free suture to set the first anchor.

Aspect 15: The method of any one of aspects 12-14, wherein the soft tissue is a cuff, the method further comprising inserting the cannula through a deltoid muscle.

Aspect 16: An assembly comprising: a first all-suture anchor; a second all-suture anchor; and a suture coupled to, and extending between, the first all-suture anchor and the second all-suture anchor.

Aspect 17: The assembly of aspect 16, further comprising: a first anchor inserter operatively coupled to the first all-suture anchor; and a second anchor inserter operatively coupled to the second all-suture anchor.

Aspect 18: The assembly of aspect 16 or aspect 17, wherein the suture defines a loop.

Aspect 19: A kit comprising: a cannula as in any one of aspects 1-11; and an assembly as in any one of aspects 16-18.

Aspect 20: The kit of aspect 19, further comprising a needle that is configured to be inserted within the first guide bore of the cannula.

Although several embodiments of the invention have been disclosed in the foregoing specification and the following appendices, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed herein, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A cannula comprising:
   a main body portion having an outer peripheral surface, a longitudinal axis, a transverse axis that is perpendicular to the longitudinal axis, and opposing first and second ends spaced relative to the longitudinal axis;
   a through-bore that extends through the main body portion from the first end of the main body portion to the second end of the main body portion, wherein the through-bore comprises a first guide bore, a second guide bore spaced from the first guide bore relative to the transverse axis, and a connecting portion that extends between the first bore and the second bore; and
   a tip portion that extends from the second end of the main body portion relative to the longitudinal axis, wherein the tip portion comprises a bore therethrough that is coaxial with the first guide bore, and wherein the tip portion is offset from a center of the main body portion relative to the transverse axis.

2. The cannula of claim 1, wherein each of the first and second guide bores is generally cylindrical and has a diameter.

3. The cannula of claim 2, wherein the connecting portion of the through-bore has a width that is less than the diameter of each of the first and second guide bores.

4. The cannula of claim 2, wherein the diameter of each of the first and second guide bores is between 1 mm and 1.5 mm.

5. The cannula of claim 1, wherein the tip portion extends between about four mm and about ten mm from the second end of the main body portion.

6. The cannula of claim 1, wherein the main body portion comprises a flange at the first end.

7. The cannula of claim 1, wherein the outer peripheral surface of the main body portion is textured.

8. The cannula of claim 1, wherein the cannula has a length relative to the longitudinal axis of between about 40 and about 80 millimeters.

9. The cannula of claim 8, wherein the cannula has a length relative to the longitudinal axis of about 70 millimeters.

10. The cannula of claim 1, wherein the first and second guide bores are spaced apart by about 5 millimeters to about 7 millimeters relative to the transverse axis.

11. A method of using a cannula as in claim 1 to attach a soft tissue to a bone at a surgical site, the method comprising:
    inserting a guide needle into the surgical site;
    inserting the cannula into the surgical site over the guide needle with the guide needle in the first guide bore so that the tip portion of the cannula extends at least partially through the soft tissue;
    removing the guide needle from the cannula;
    forming a first anchor site into the bone through the first guide bore;
    inserting a first anchor into the first anchor site;
    forming a second anchor site into the bone through the second guide bore;
    inserting a second anchor into the second anchor site;
    inserting a surgical thread into the first anchor through the first guide bore; and
    inserting the surgical thread into the second anchor through the second guide bore.

12. The method of claim 11, further comprising:
    tying a sliding locking knot; and
    tightening the surgical thread to pull the soft tissue against the bone.

13. The method of claim 11, wherein inserting the first anchor into the first anchor site comprises pulling on a free suture to set the first anchor.

14. The method of claim 11, wherein the soft tissue is a cuff, the method further comprising inserting the cannula through a deltoid muscle.

15. A kit comprising:
   a cannula as in claim 1; and
   an assembly having:
   a first all-suture anchor;
   a second all-suture anchor; and
   a suture coupled to, and extending between, the first all-suture anchor and the second all-suture anchor.

16. The kit of claim 15, further comprising a needle that is configured to be inserted within the first guide bore of the cannula.

\* \* \* \* \*